United States Patent [19]

Logan

[11] 4,133,111

[45] Jan. 9, 1979

[54] APPARATUS FOR DETECTING LIMITS OF TRAVEL

[75] Inventor: David J. Logan, Glastonbury, Conn.

[73] Assignee: Gerber Scientific Inc., South Windsor, Conn.

[21] Appl. No.: 818,212

[22] Filed: Jul. 22, 1977

[51] Int. Cl.[2] .......................... H01H 17/12; B23Q 5/00; B23Q 5/54

[52] U.S. Cl. .......................... 33/1 M; 200/47; 200/161; 29/65; 90/13.1

[58] Field of Search .................. 318/626; 200/47, 161; 33/1 M, 18, 80; 346/29; 90/131; 29/65; 83/925 CC

[56] References Cited

U.S. PATENT DOCUMENTS

| | | | |
|---|---|---|---|
| 2,014,474 | 9/1935 | Hopkins | 200/161 |
| 2,620,256 | 12/1952 | Kerns et al. | 346/29 |
| 2,640,131 | 5/1953 | Cole | 200/161 |
| 2,843,689 | 7/1958 | Roberts | 200/161 |
| 3,738,007 | 6/1973 | Tuskos | 33/18 R |

*Primary Examiner*—Richard E. Aegerter
*Assistant Examiner*—John W. Shepperd
*Attorney, Agent, or Firm*—McCormick, Paulding & Huber

[57] ABSTRACT

A motor driven plotter has a plotting head which is translated in two coordinate directions over the work surface of a plotting table. The plotting head is mounted on a first carriage which moves in one coordinate direction and a second carriage is mounted on the first for movement in the second coordinate direction. The limits of both carriages in each coordinate direction are directed by means of a pull cord suspended in a rectangular pattern from the first carriage. A cord portion or segment is intersected and extended by a contact at each limit of travel in the coordinate directions. A switch connected to the cord produces a limit signal when the cord is extended.

12 Claims, 5 Drawing Figures

APPARATUS FOR DETECTING LIMITS OF TRAVEL

BACKGROUND OF THE PRESENT INVENTION

The present invention relates to a machine tool having controlled movement in fixed coordinate directions with limits of travel in each direction. More particularly, the invention relates to an improved apparatus for detecting the limits of travel in each direction.

In practically all multi-axis machine tools which produce relative movement between a tool and a workpiece, it is customary to employ electrical limit stops or switches that remove or terminate energizing power or signals when the tool or a carriage on which the tool is mounted has reached its limit of travel in one coordinate direction. In an XY plotter, for example, there is generally one carriage, denominated the X-carriage, which traverses the work surface of a plotting table in the X-coordinate direction between two limits at opposite ends of the table. A Y-carriage, frequently mounted on the X-carriage to traverse the work surface in the X-direction, moves relative to the X-carriage and work surface in the orthogonal or Y-coordinate direction between two limits. To prevent the carriages from moving too far and thus exceeding the physical and control limits, electrical switches on the table actuated by cams on the carriages are conventionally employed to produce limit signals. The limit signals are employed to terminate motion of the carriages altogether or at least motion of the carriage that has reached the limit of travel. The integrity of the machine is thereby protected.

In the XY plotter described above it is possible that as many as six limit switches would be required for the two axes of motion. Since the X-carriage normally spans the work surface of the plotting table between ways that extend along each side of the table parallel to the direction of motion, a limit stop associated with each end of each way may be required to anticipate slight misalignments or skewing which bring one end of the carriage to its limit before the opposite end. Thus a total of four limit switches may be needed for the X-coordinate axis itself and with the Y-carriage moving back and forth between two other limits, at least two additional limit switches would be needed to secure the system against over-travel in both coordinate directions.

Providing six limit switches at widely spaced points on the plotting table and interconnecting such switches to insure against over-travel entails some expense and increases reliability problems because of the number of components which must be operative.

It is, accordingly, a general object of the present invention to provide an improved limit detecting apparatus that is simpler in construction, less expensive and more reliable.

SUMMARY OF THE INVENTION

The present invention resides in a machine that produces relative movement between a tool and a workpiece in orthogonal coordinate directions. The machine includes a work table for holding the workpiece, and a work tool for operating upon the workpiece as it is held on the table.

First movable means connected between the work table and the tool move the tool and workpiece relative to one another in one coordinate direction between two opposite limits of travel. A second movable means connected between the table and the tool move the tool and workpiece relative to one another in another coordinate direction between another two opposite limits of travel. Typically, the first and second movable means comprise a first carriage movable in one coordinate direction of the machine and a second carriage movable in another direction. The second carriage can be mounted for movement on the first and in such case the tool is usually mounted on the second carriage while the workpiece is positioned in stationary relationship on the table over which the carriages are moved.

Limit detection means for detecting relative movement of the tool and workpiece at each of the limits of travel produces a limit signal at any one limit. The detection means includes a pull cord suspended to form a plurality of interconnected cord segments. In a two axis system the cord typically forms a rectangular pattern with four segments arranged in parallel pairs, each pair extending at right angles to an associated coordinate axis.

The detection means also includes a plurality of cord contacts which are disposed to intersect and extend at least one cord segment when the limits of travel are reached. A switch is connected with the pull cord and is actuated by the cord to produce a limit signal any time one of the segments is intersected and extended by a contact at a limit of travel.

The advantage of the improved limit detecting means is that one switch rather than six is needed to detect the limits of travel along two coordinate axes. A further advantage is obtained by locating the cord segments close to the work surface of the table so that objects or an operator's hand in the way of a carriage intersects the cord before the carriage and terminates motion without injury to either the machine or the operator.

DESCRIPTION OF THE PREFERRED EMBODIMENTS

Figure 1:
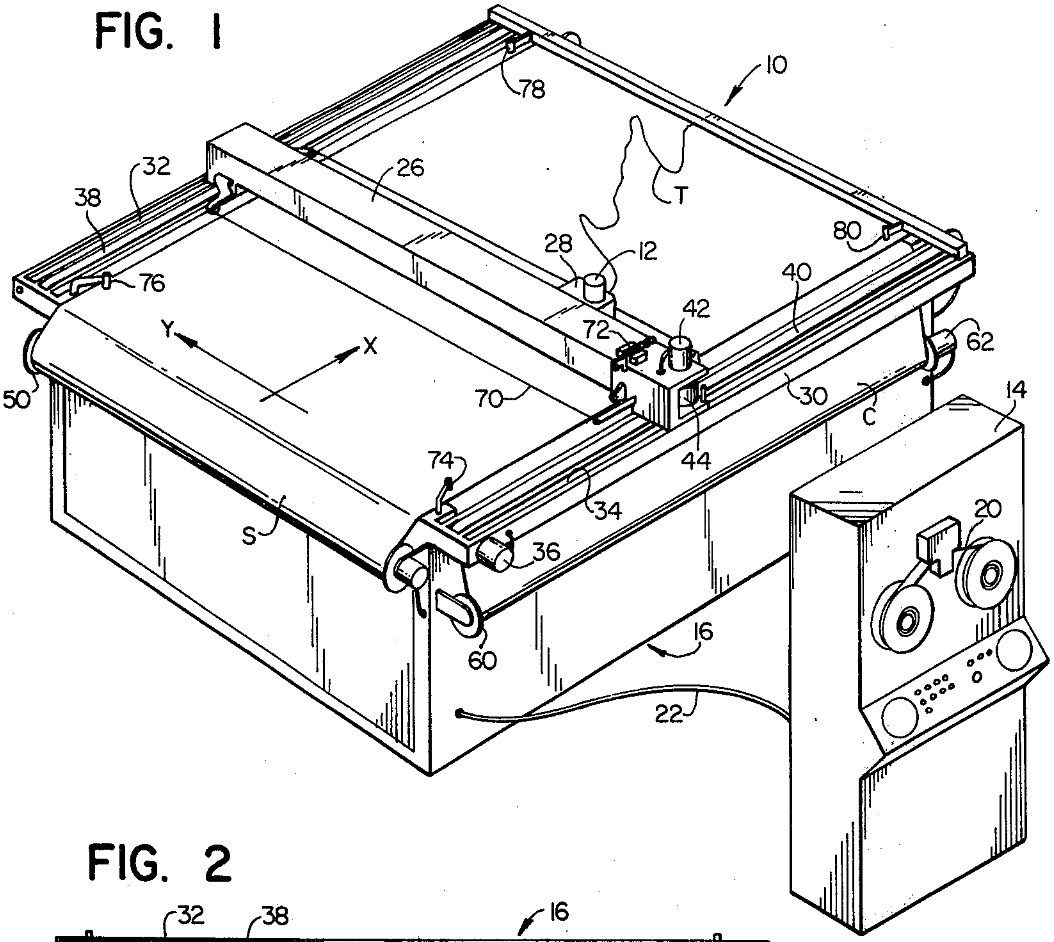
FIG. 1 is a perspective view of an automatically controlled plotter in which the present invention is embodied.

FIG. 1 shows an automatically controlled plotting system, generally designated 10, which provides a typical environment for the present invention. The plotting system includes a plotting instrument or head 12 which produces graphical information on a strip S of sheet material formed of plotting paper. Although a plotting system has been selected for illustration of the invention, it should be understood that the invention has utility in many other machine systems such as machines having movable tracking heads, sewing heads, cutting tools and other instruments.

The numerically controlled plotting system is comprised basically of a controller 14 which generates plotting commands, and a flat bed plotting table 16 which responds to the commands and causes a plotting head 12 to draw graphic information on the strip S. The controller 14 reads a plotting program from a punched or magnetic tape 20 and converts the program into motor command signals that are transmitted to drive motors on the plotting table 16 by way of a connecting cable 22.

The plotting table 16 includes an X-carriage 26 which moves back and forth over the table in the illustrated X-coordinate direction and a Y-carriage 28 mounted on the X-carriage and movable relative to the X-carriage and the strip of plotting material in the illustrated Y-coordinate direction. Composite motions of the of the carriages 26 and 28 permit the plotting head 12 to be translated to any coordinate of the work surface on the bed 30 which supports one section of the strip of plotting material. The X-carriage 26 is accurately guided during motions in the X-direction by means of a round way 32 at one side of the table and by means of a flat way 34 at the opposite side. An X-drive motor 36 receives motor commands from the controller 14 through the cable 22, and drives a system of toothed pulleys and belts 38 and 40 connected to the X-carriage 26 at opposite sides of the plotting table 16 respectively. In this manner the carriage is translated in the X-coordinate direction to various positions over the table.

The X-carriage 26 spans or bridges the work surface of the plotting table and the Y-carriage 28 is mounted and accurately guided on the bridging portion for movement above the table in the Y-coordinate direction. A Y-drive motor 42 receives motor command signals from the controller 14 through the cable 22 and drives another system of toothed pulleys and drive belts 44 connected with the Y-carriage 28. In this manner, the Y-carriage 28 is accurately positioned in the Y-coordinate direction along with the plotting head 12.

The plotting head 12 may contain a pen, light head or other plotting instrument which is actuated whenever a line trace T or other graphic image is to be placed on the strip S of plotting material. Operation of the plotting instrument is also regulated by the controller 14.

Figure 2:
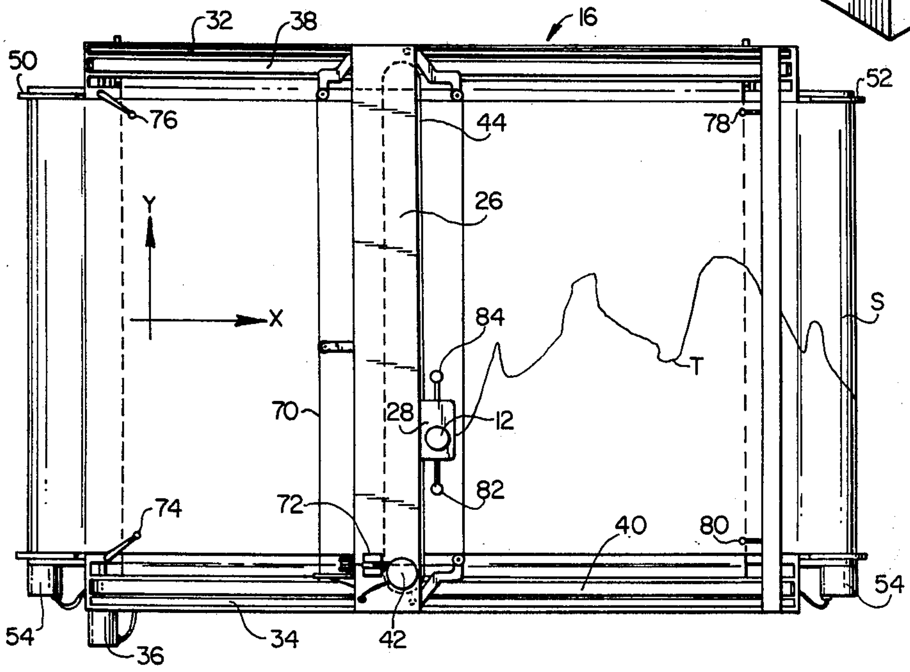
FIG. 2 is a top plan view of the plotting table shown in FIG. 1.

As shown in FIGS. 1 and 2 the strip S of plotting material is supported on rolls or feed spools 50 and 52 held respectively by brackets at opposite longitudinal ends of the table 16. A torque motor 54 is driveably connected with the spool 50 and another torque motor 56 is driveably connected with the spool 52 to hold a section of plotting paper taut on the work surface of the plotting table. If separate clamps are provided at each end of the table, the torque motors may be utilized to maintain predetermined amounts of paper in loops at one or both ends of the table so that the material can be freely indexed between the spools 50 and 52 when desired.

In order to produce duplicate copies of the information plotted on the strip S of sheet material, or in order to improve the image of the line trace T for photographic purposes, a strip of carbon or mimeographic material C may extend under the strip S of plotting material. As shown in FIG. 1 the strip C extends in the Y-coordinate direction transverse to the strip S and is mounted at one side of the table on a spool 60. The opposite end of the strip C is mounted on a corresponding spool (not visible) at the opposite side of the table so that the strip can be advanced periodically to place fresh carbon or mimeographic material under the strip S. A drive or torque motor 62 is provided for this purpose.

In accordance with the present invention, the carriages 26 and 28 are provided with a unique apparatus for detecting the limits of travel in both the X and Y coordinate directions. The apparatus includes a pull cord 70 suspended from the X-carriage 26 at a plurality of spaced points so that the cord is divided into a plurality of segments which are unsupported between the points. The apparatus further includes a switch mechanism 72 connected with the cord and a plurality of cord contacts 74, 76, 78 and 80 attached to opposite ends of the plotting table 16 and contacts 82 and 84 attached to the Y-carriage 28.

Figure 3:
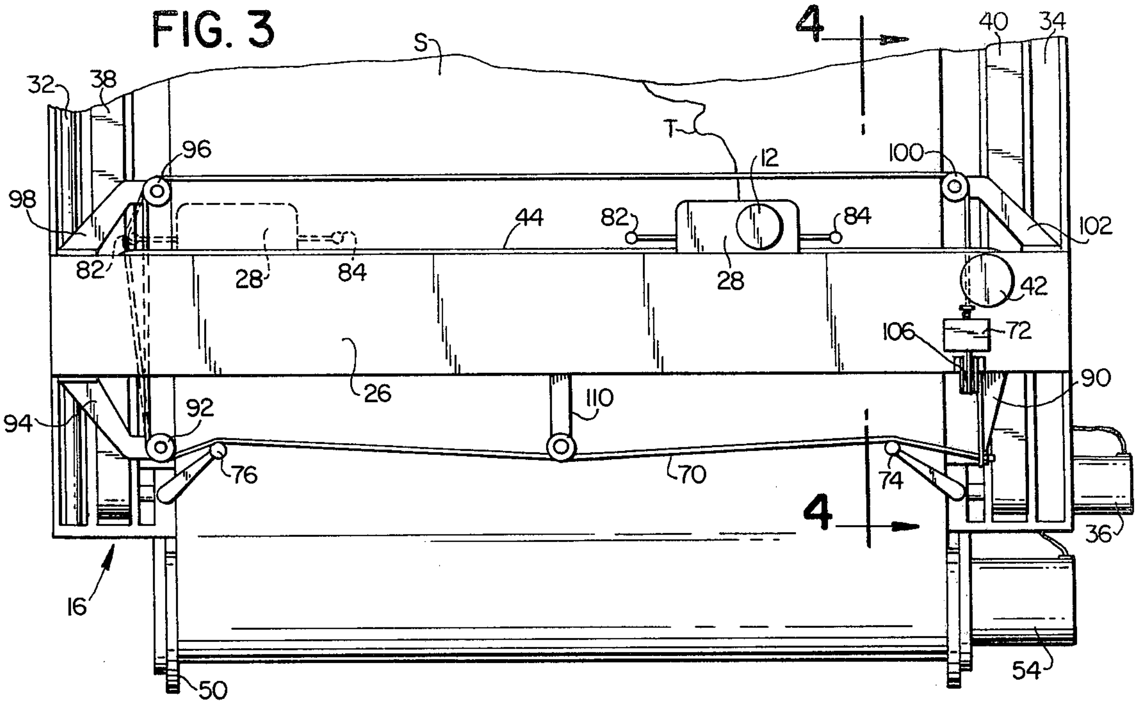
FIG. 3 is a fragmentary plan view of one end of the plotting table and shows details of the limit detection means and the carriages at the limits of travel.
Figure 4:
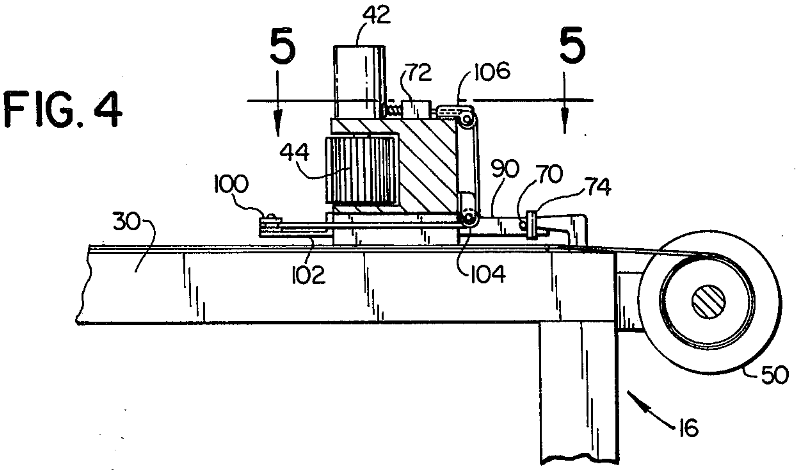
FIG. 4 is a fragmentary sectional view of the plotting table with the carriage at the limit stop as seen along the sectioning line 4—4 in FIG. 3.

Reference to FIGS. 3 and 4 illustrates the construction and operation of the limit detection apparatus in greater detail.

One end of the pull cord which may be a thin cable, string, wire or other flexible, elongated filament is fixedly attached to a bracket 90 on the X-carriage 26 and extends in a generally rectangular pattern around four points corresponding generally to the four corners of the carriage 26. The first point is defined by the attachment point of the cord 70 to the bracket 90 and the second point is defined by a freely rotatable pulley 92 mounted on a bracket 94 fixed to the end of the X-carriage remote from the bracket 90. In a similar manner the third point is defined by a freely rotatable pulley 96 mounted on a fixed bracket 98 at the opposite side of the carriage from the bracket 94 and the fourth point is defined by a pulley 100 mounted on a bracket 102 fixed to the side of the X-carriage opposite the bracket 90. From the pulley 100 the cord 70 extends under or through an opening in the X-carriage 26 to a lower freely rotatable pulley 104 and thence to an upper pulley 106. From the upper pulley the cord extends to the switch mechanism 72. With the cord suspended in this fashion, the contiguous cord segments between suspension points are at right angles to each other. The cord 70 is preferably made of non-elastic material, that is, a material that has a very high modulus of elasticity, so that any time a section of the cord intersects an object, the section is extended rather than stretched and the cord pulls the switch mechanism and opens an electrical circuit to generate a limit signal.

As shown in FIG. 3 the X-carriage 26 has traveled to one end of the table adjacent the fixed contacts 74 and 76, and the contacts together with a central support 110 on the carriage lengthen the segment between the brackets 90 and 92. The end of the cord connected with the bracket 90 remains fixed but the opposite end connected to the switch mechanism 72 pulls the switch to generate a limit signal.

Figure 5:
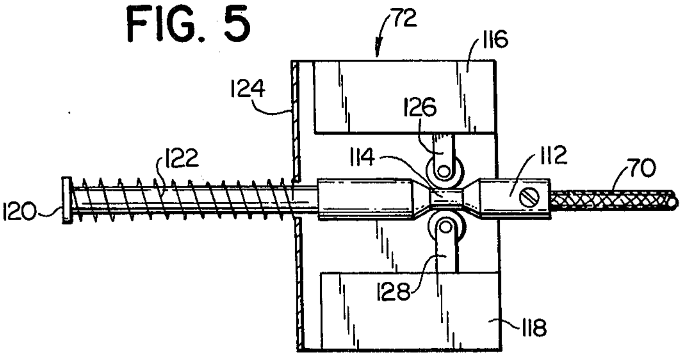
FIG. 5 is a top plan view showing details of the limit switch as seen along the line 5—5 in FIG. 4.

FIG. 5 illustrates one embodiment of the switch mechanism 72. The pull cord 70 is connected to an actuating rod 112 that is provided with a reduced neck portion 114 serving as a detent for microswitches 116 and 118. The rod 112 has a cap 120 at the end opposite the cord 70, and a coil spring 122 sandwiched between the cap and the housing 124 of the mechanism holds the cord in tension with the roller armatures 126 and 128 of the switches 116 and 118 respectively in the detent position. When the cord 70 is intercepted by the contact 74 and 76 as shown in FIG. 3 the operating rod 112 is pulled by the cord out of the detent position and both of the armatures 126 and 128 are displaced relative to the switch housings to trip the microswitches 116 and 118 respectively. Although one microswitch would be satisfactory to produce a limit signal, two switches are employed for redundancy. If the switches are normally closed, a continuity circuit with the two switches in series would provide a highly reliable and fail safe limit signal since actuation of either one of the switches breaks the circuit.

It will be understood that if the X-carriage 26 is skewed slightly on the ways 32 and 34 when a travel limit is reached in FIG. 3, the pull cord 70 may intersect only one of the contacts 74 or 76. Nevertheless, intersection of only one contact lengthens the cord segment between the bracket 90 and the pulley 92 so that the switch mechanism 72 is tripped anyway.

The pull cord 70 and the contacts 74, 76, 78 and 80 cooperate to produce limit signals for the X-carriage 26 at either end of travel over the work surface in the X-coordinate direction. However, the cord is also utilized in conjunction with the contacts 82 and 84 connected to the Y-carriage 28 to produce limit signals when the carriage 28 has reached the limits of travel in the Y-coordinate direction.

It will be observed in FIG. 3 that the Y-carriage 28 shown in the phantom position adjacent the one end of the X-carriage 26 causes the contact 82 to intersect and lengthen the segment of pull cord 70 extending between the pulleys 92 and 96. This lengthening of the cord also pulls the actuating rod 112 of the switch mechanism 72 and trips the microswitches 116 and 118 to generate a limit signal. In a similar manner the contact 84 will intersect and lengthen the cord segment extending between the pulley 100 and the pulley 104 when the Y-carriage 28 has reached its limit of travel at the opposite end of the X-carriage 26.

In summary, apparatus for detecting the limits of travel in a machine tool having fixed axes of motion is comprised of a pull cord, a switch mechanism and a plurality of contacts which intersect and pull the cord to actuate the switch mechanism at any limit of travel. The apparatus is an improvement over the prior art since it reduces the number of switches needed and cost and correspondingly increases the reliability of the system. Furthermore, with the pull cord in tension due to the coil spring 122 and the switch mechanism in a continuity circuit, the apparatus is failsafe since any break in the cord or failure of the switch produces a limit signal. Still further, by locating segments of the pull cord 70 close to the work surface of the table 16 and on opposite sides of the X-carriage 26 as shown in FIG. 3, any obstacles on the plotting surface will intersect the cord in the same manner as the contacts and produce a limit signal that can automatically terminate carriage motion. The same result occurs in the event that an individual puts his hand over the work surface when the carriage is traversing the surface. Thus the pull cord serves not only a protective function but a safety function as well.

While the present invention has been described in a preferred embodiment it will be understood that numerous modifications or substitutions can be made with departing from the spirit of the invention. For example, in the illustrated apparatus two contacts are disposed at each limit of travel in the X-coordinate direction. These contacts are provided to protect the system in the event that the X-carriage 26 is skewed on the ways of the plotting table at either limit. If skewing is not a problem or if tolerances at the limits of travel are not critical, only one contact may be needed at each end of the table. The support 110 attached to the midpoint of the X-carriage is not essential but merely adds to the change in length of the pull cord at the limit. In the rectangular pattern, the pull cord segments extend perpendicular to the coordinate axis having travel limits with which the respective segments are associated. The segments, however, need not be perpendicular to the axes but should form an angle therewith to minimize the need for more complex contacts. It is anticipated that by appropriate positioning the cord can be intersected by contacts associated with limits of travel along other coordinate axes or just one axis. It should be understood that the switch mechanism 72 need not be connected to the end of the pull cord but can be situated or connected to any intermediate point of the cord so that one part of the switch is moved relative to the other whenever the cord is pulled. Accordingly, the present invention has been described in a preferred embodiment by way of illustration rather than limitation.

I claim:

1. A machine producing relative movements between a tool and a workpiece comprising:
- a work table for holding a workpiece;
- a work tool for operating upon the workpiece on the table;
- first movable means connected between the work table and tool for moving the tool and workpiece relative to one another in one coordinate direction between two opposite limits of travel;
- second movable means connected between the work table and tool for moving the tool and workpiece relative to one another in another coordinate direction between another two opposite limits of travel;
- limit detecting means for detecting relative movement of the tool and workpiece at each of said limits of travel and producing a limit signal including a pull cord suspend at a plurality of spaced points to form a plurality of interconnected and angularly disposed cord segments, a plurality of cord contacts disposed to intersect and change the length of at least one cord segment at each of said limits of travel, and a switch connected with the pull cord and actuated to produce the limit signal by extension of any one of the cord segments at a limit of travel.

2. A machine as defined in claim 1 wherein:
- the first movable means comprises a first motor driven carriage for moving the tool and workpiece relative to one another in one coordinate direction;
- the second movable means comprises a second motor driven carriage for moving the tool and workpiece relative to one another in the other coordinate direction; and
- the pull cord is suspended from the first carriage and two of the cord contacts are mounted on the second carriage.

3. A machine as defined in claim 2 wherein the pull cord is suspended from the first carriage with contiguous cord segments at right angles, each segment extending generally perpendicular to the coordinate direction having a limit associated with the respective segment.

4. A machine as defined in claim 2 wherein:
- the second carriage is mounted on the first carriage for movement in the second coordinate direction;
- the tool is mounted on the second carriage for movement by the first and second carriages in the first and second coordinate directions; and
- the pull cord has four cord segments suspended from the first carriage in a rectangular pattern with two of the segments at right angles to the first coordinate direction and being spaced in parallel relationship with the tool and first and second carriages located therebetween.

5. In a machine having first and second carriages for positioning a tool over the work surface of a table having predefined limits, the first carriage being movable in a first coordinate direction between opposite limits of the table work surface and the second carriage being mounted on the first and movable in the second coordinate direction between other opposite limits of the table work surface, the tool being mounted on the second carriage for movement in both coordinate directions, an improved limit detecting apparatus comprising: a nonelastic cord suspended from at least four points and forming a plurality of interconnected, angularly arranged cord sections extending generally parallel to the work surface of the table, two sections extending at angles to the second coordinate direction, and at least one section extending at an angle to the first coordinate direction, first means responsive to movement of the first carriage at one limit of the work surface for intersecting and lengthening said other section and thereby pulling the nonelastic cord; second means responsive to movement of the second carriage on the first at another limit of the work surface for intersecting and lengthening one of said two sections and thereby pulling the nonelastic cord; and third means responsive to movement of the second carriage on the first at still another limit of the work surface for intersecting and lengthening the other of said two sections and thereby pulling the cord; and switching means connected with the cord and responsive to any pulling of the cord for tripping the switch and providing a limit signal.

6. The improved limit detecting apparatus of claim 5 including another cord section extending at an angle to the first coordinate direction; the first means being responsive to movement of the first carriage at only one limit of movement; and fourth means responsive to movement of the first carriage at the other limit for intersecting and lengthening said other cord section extending at an angle to the first coordinate direction and thereby pulling the cord.

7. The improved limit detecting apparatus of claim 6 wherein the plurality of interconnected cord sections include four cord sections arranged in a rectangular pattern.

8. The improved limit detecting apparatus of claim 7 wherein two of the four cord sections extend at right angles to the first coordinate direction and are intersected respectively by the second and third means; and the other two of the four cord sections extend at right angles to the second coordinate direction and are intersected respectively by the first and fourth means.

9. The improved limit detecting apparatus of claim 5 wherein the plurality of cord sections are suspended from four points on the first carriage associated respectively with four corners of the carriage.

10. A machine producing relative movements between a tool and a workpiece comprising: a work tool and a work table for holding a workpiece as it is operated upon by the tool; means for moving the tool and the workpiece mounted on the table relative to one another in at least one coordinate direction between two opposite limits of travel; and limit detecting means for detecting relative movement of the tool and workpiece at said limits of travel and producing a limit signal, said detecting means including a pull cord suspended to form a plurality of interconnected cord segments associated with the opposite limits of travel, means connected with and resiliently tensioning the suspended pull cord and a plurality of cord contacts associated with the limits of travel for engaging respectively cooperative cord segments and pulling the cord in opposition to the resilient tension as relative movement takes place between the tool and workpiece at the associated limits of travel, the detecting means also including a switch means connected to the pull cord for actuation and generation of a limit signal when any segment of the cord is intercepted and pulled by a contact at a limit of travel.

11. A machine producing relative movements as defined in claim 10 wherein: the moving means includes a carriage that moves in one coordinate direction in order to produce the relative movement between the workpiece and the tool; and the limit detecting means includes four spaced contacts defining the limits of travel of the carriage in the one coordinate direction and the pull cord is suspended in a generally rectangular pattern to be intercepted by said contacts at the limits of travel.

12. A machine producing relative movements as defined in claim 10 wherein: the moving means includes a carriage that moves in one coordinate direction relative to another member in order to produce relative movement between the workpiece and tool; and the limit detecting means includes two spaced contacts mounted on the carriage and associated with the limits of travel of the carriage in the one coordinate direction, and the pull cord is suspended from the other member for intersection with the respective contacts at the limits of travel.

* * * * *

UNITED STATES PATENT OFFICE
CERTIFICATE OF CORRECTION

Patent No. 4,133,111 Dated January 9, 1979

Inventor(s) David J. Logan

It is certified that error appears in the above-identified patent and that said Letters Patent are hereby corrected as shown below:

Abstract, line 7, after "of" insert --travel of--.

Column 5, line 42, "failsafe" should be --fail safe--.

Column 6, line 34, "suspend" should be --suspended--.

Signed and Sealed this

*Eighth* Day of *May 1979*

[SEAL]

*Attest:*

RUTH C. MASON
*Attesting Officer*

DONALD W. BANNER
*Commissioner of Patents and Trademarks*